United States Patent [19]
Robb

[11] Patent Number: 4,832,472
[45] Date of Patent: May 23, 1989

[54] MAPPING LENS

[75] Inventor: Paul N. Robb, Sunnyvale, Calif.

[73] Assignee: Lockheed Missiles & Space Company, Inc., Sunnyvale, Calif.

[21] Appl. No.: 74,659

[22] Filed: Jul. 17, 1987

[51] Int. Cl.[4] .......................... G02B 13/06; G02B 9/12
[52] U.S. Cl. ...................................... 350/463; 350/1.2
[58] Field of Search ............... 350/463, 475, 476, 474, 350/477, 478, 1.2, 1.4

[56] References Cited

U.S. PATENT DOCUMENTS

| | | | |
|---|---|---|---|
| 1,759,529 | 5/1930 | Von Hoff | 350/478 |
| 2,085,437 | 6/1937 | Michelssen | 350/1.4 |
| 2,176,482 | 11/1937 | Altman | 350/478 |
| 4,632,498 | 12/1986 | Neil | 350/1.2 |
| 4,659,171 | 4/1987 | Neil | 350/1.2 |
| 4,681,407 | 7/1987 | Mercado | 350/464 |
| 4,761,064 | 8/1988 | Mercado | 350/482 |
| 4,762,404 | 8/1988 | Mercado | 350/483 |
| 4,765,727 | 8/1988 | Mercado | 350/483 |

OTHER PUBLICATIONS

Robb et al, "Wide-Field Diffraction-Limited Gauss Objective Having a Curved Focal Surface", Journal of the Optical Society of America, vol. 72, Oct. 19, 1982, p. 1725.

Primary Examiner—Rodney B. Bovernick
Assistant Examiner—Terry S. Callaghan
Attorney, Agent, or Firm—John J. Morrissey

[57] ABSTRACT

Design forms for wide-field mapping lenses are disclosed wherein limitations on resolving power attributable to monochromatic aberrations have been minimized, wherein chromatic aberration has been minimized over a broad wavelength band and has been reduced to zero for paraxial marginal rays at three discrete wavelengths, and wherein chromatic variations of the monochromatic aberrations (particularly chromatic variation of coma) have been substantially eliminated. Each of the lenses disclosed has an aperture diameter in the range from 10 to 15 inches, a focal length in the range from 200 to 300 inches, and a circular field of view in the range from 40° to 60°. Further, each lens is diffraction limited in a spectral range from 0.50 to 0.80 micron over the entire field of view. The focal surface for each lens disclosed is curved, so that illumination fall-off from the center to the edge of the focal surface varies by a factor of only about $\cos^{1.5} \theta$, where $\theta$ is the half-field angle of the lens.

6 Claims, 15 Drawing Sheets

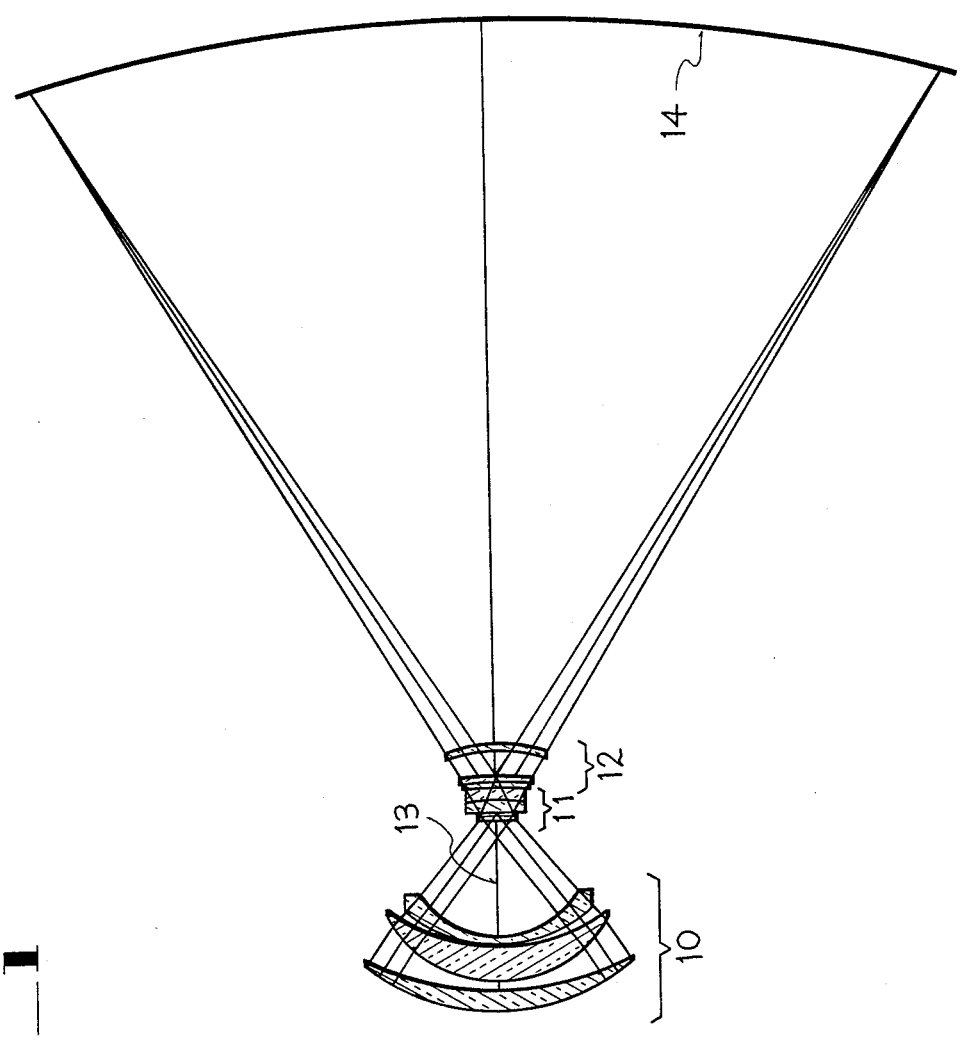
FIG_1

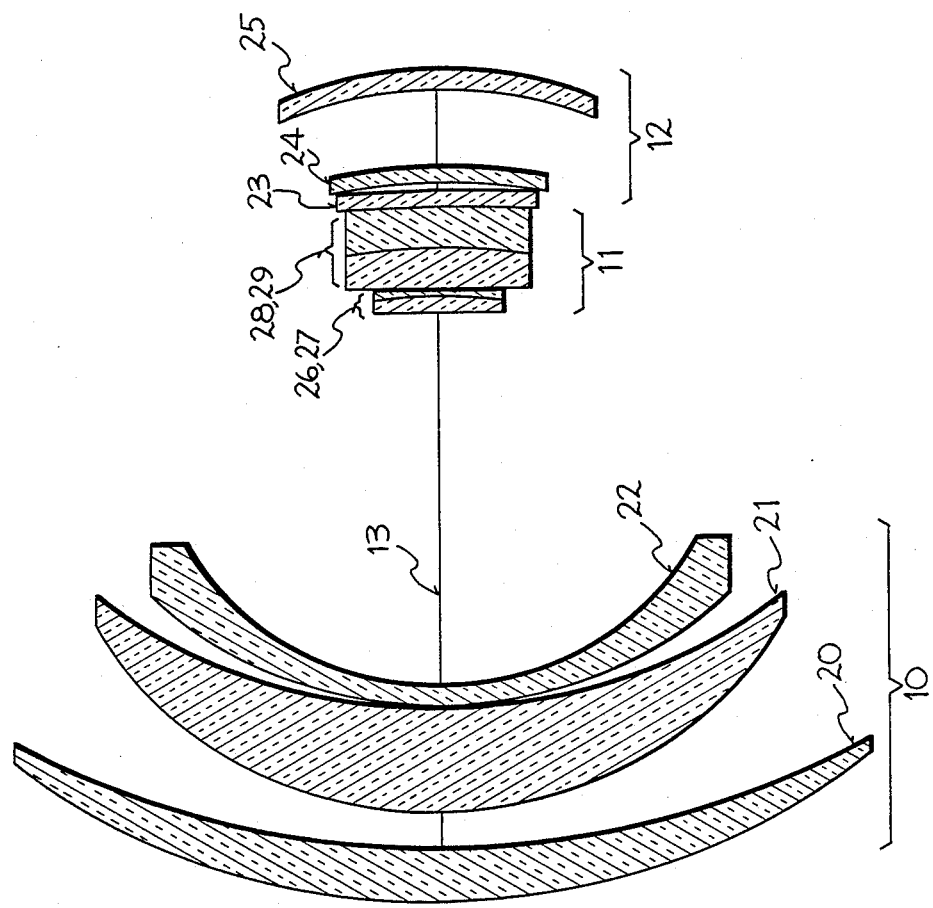
FIG_2

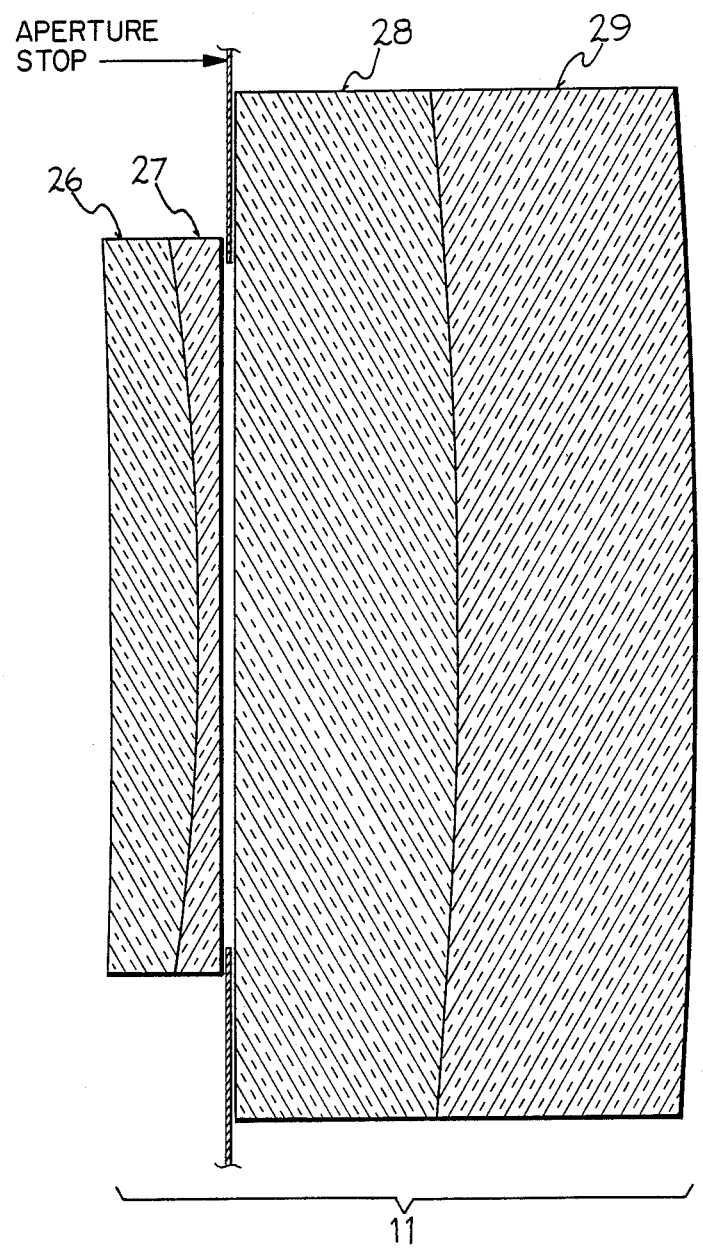

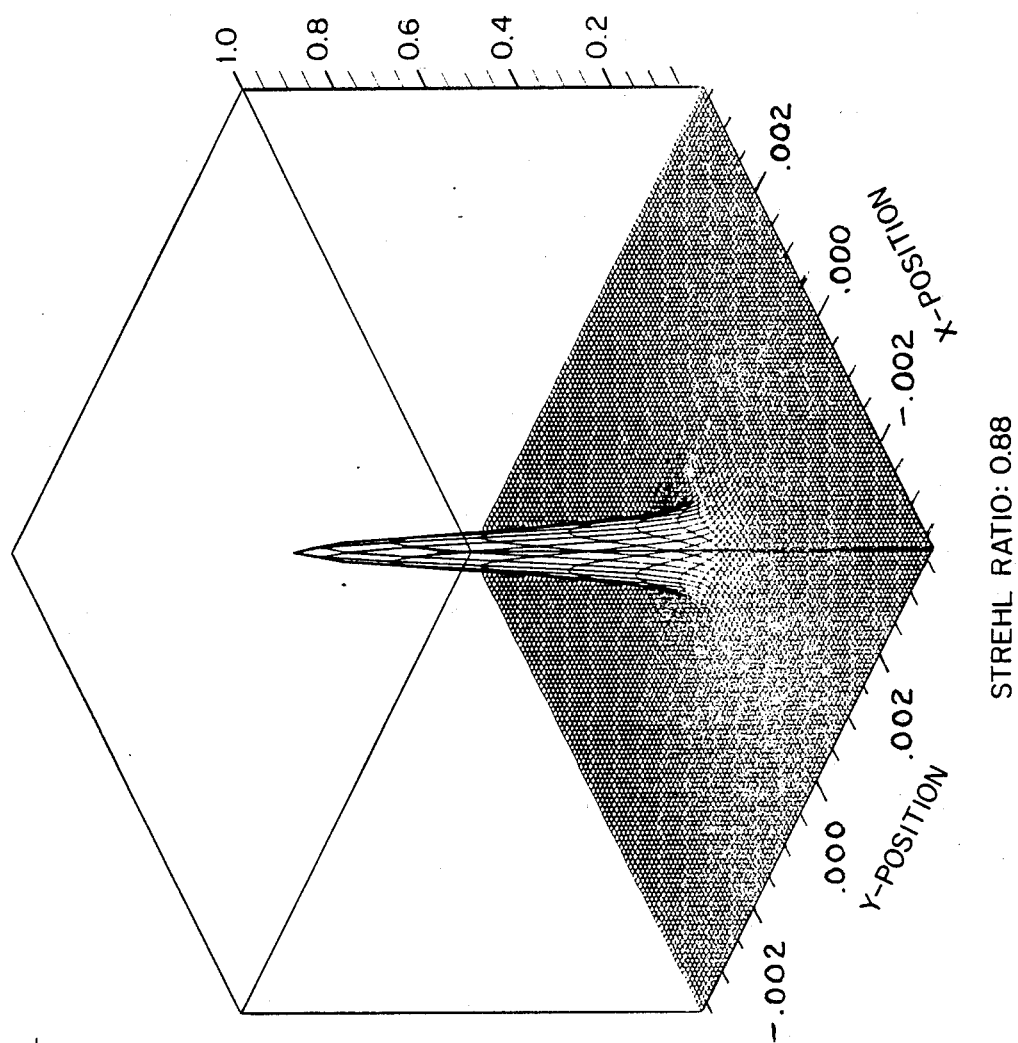
FIG_4

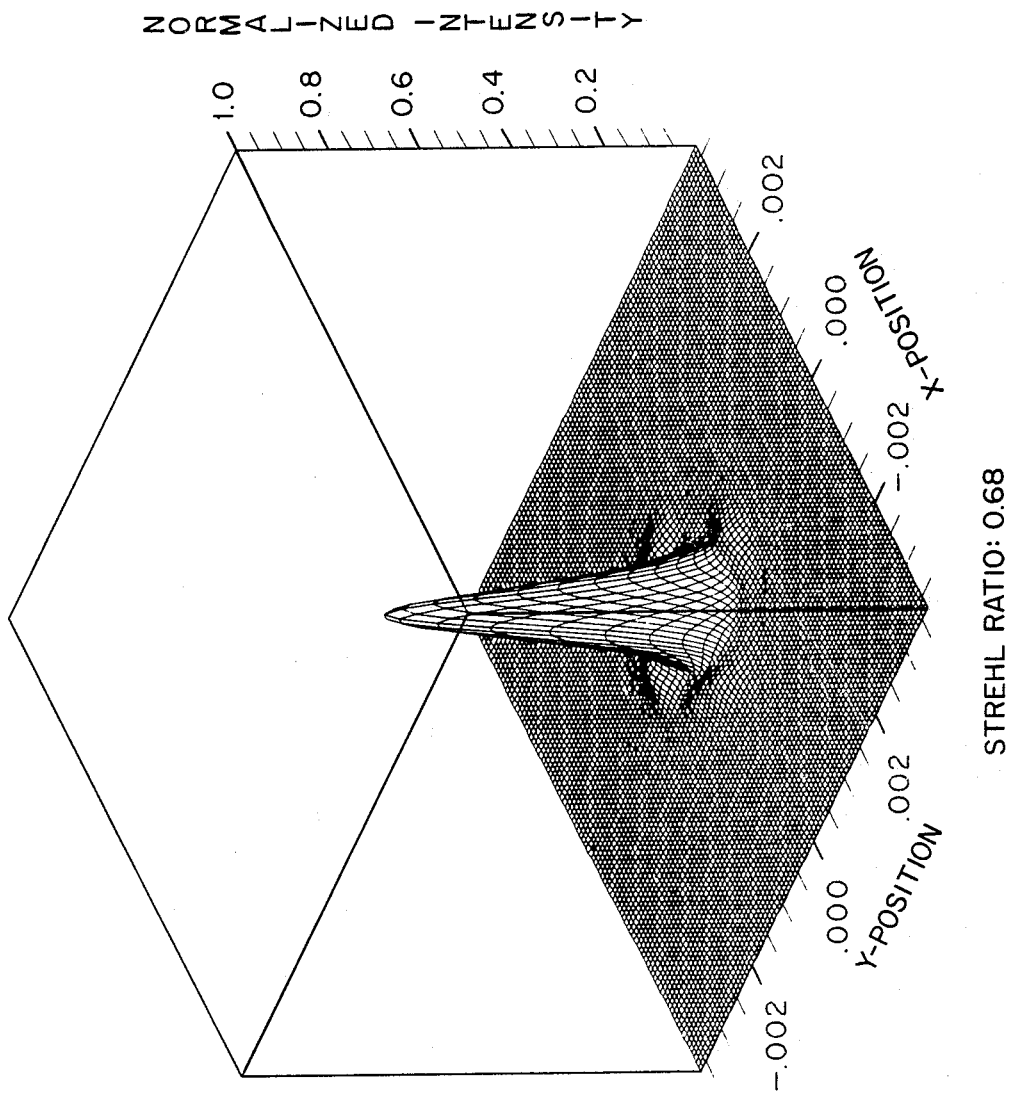
FIG_5

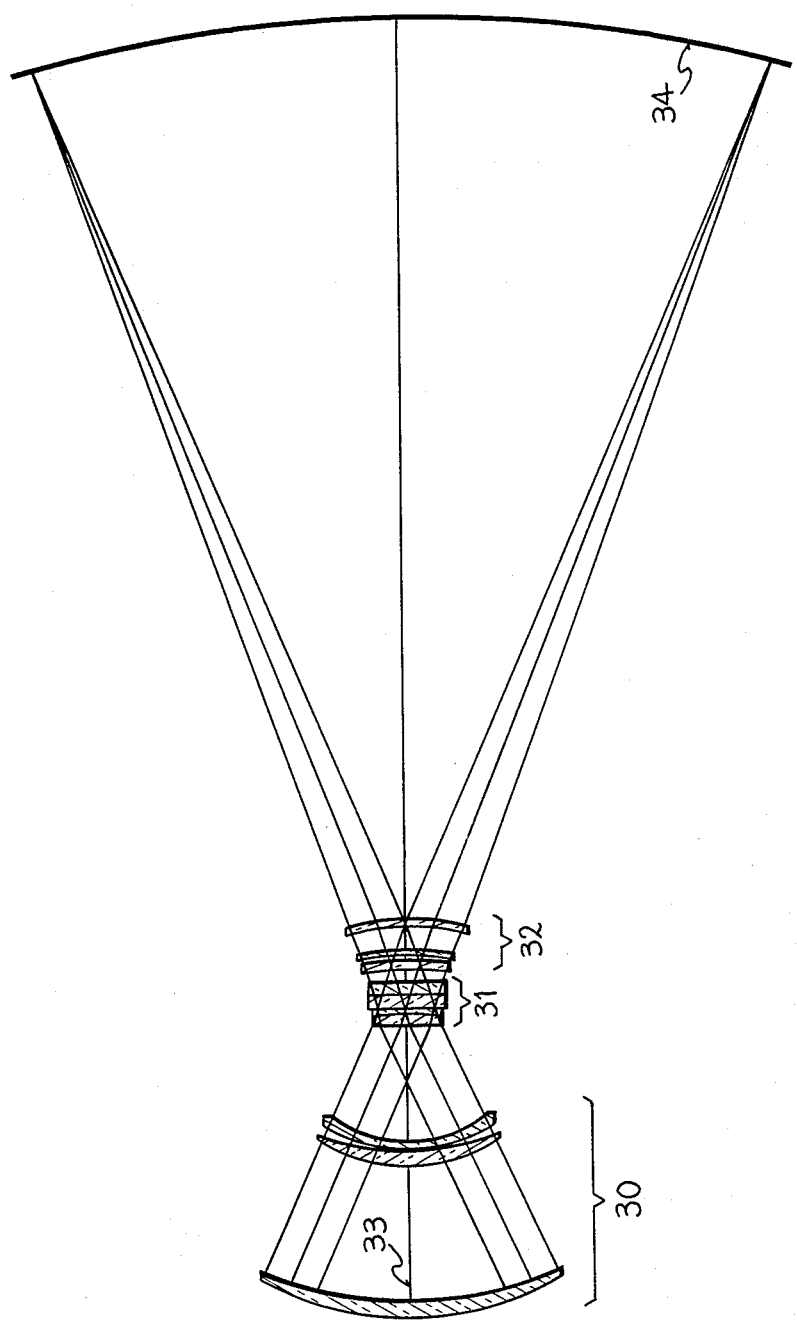
FIG_6

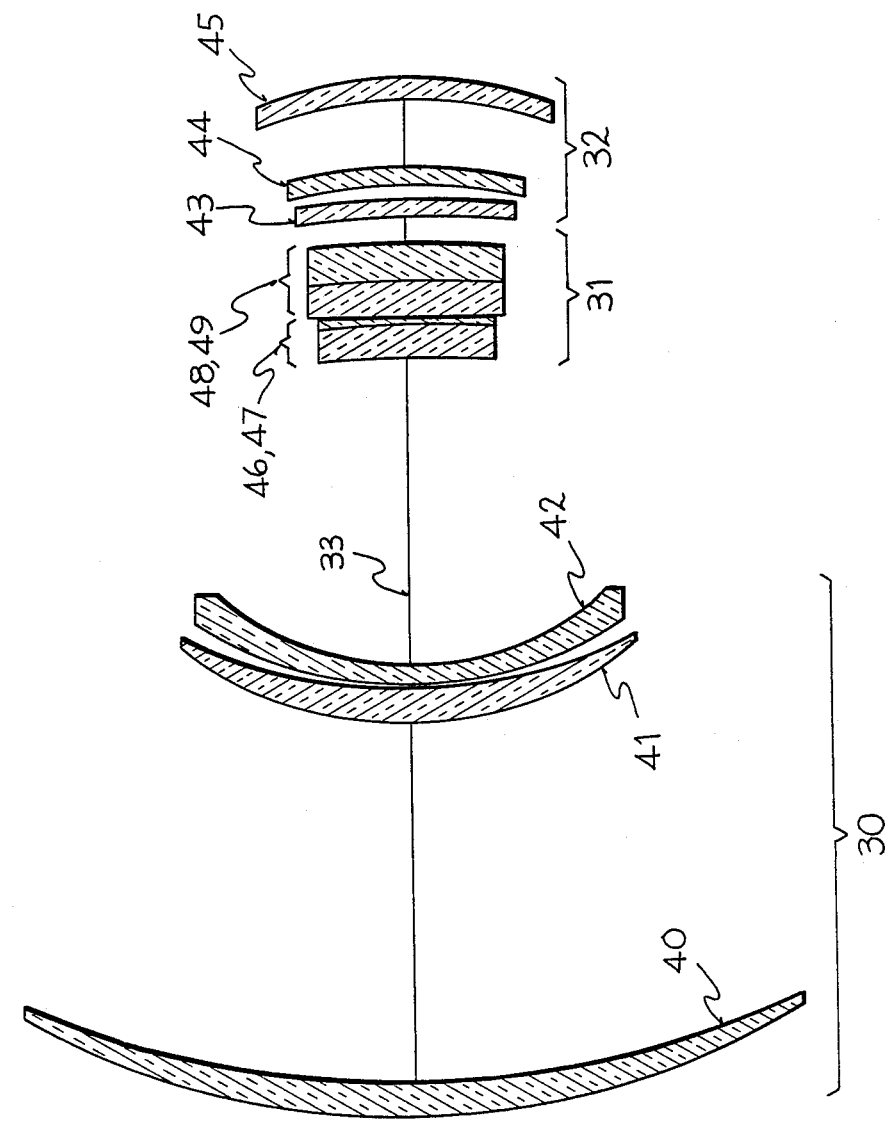

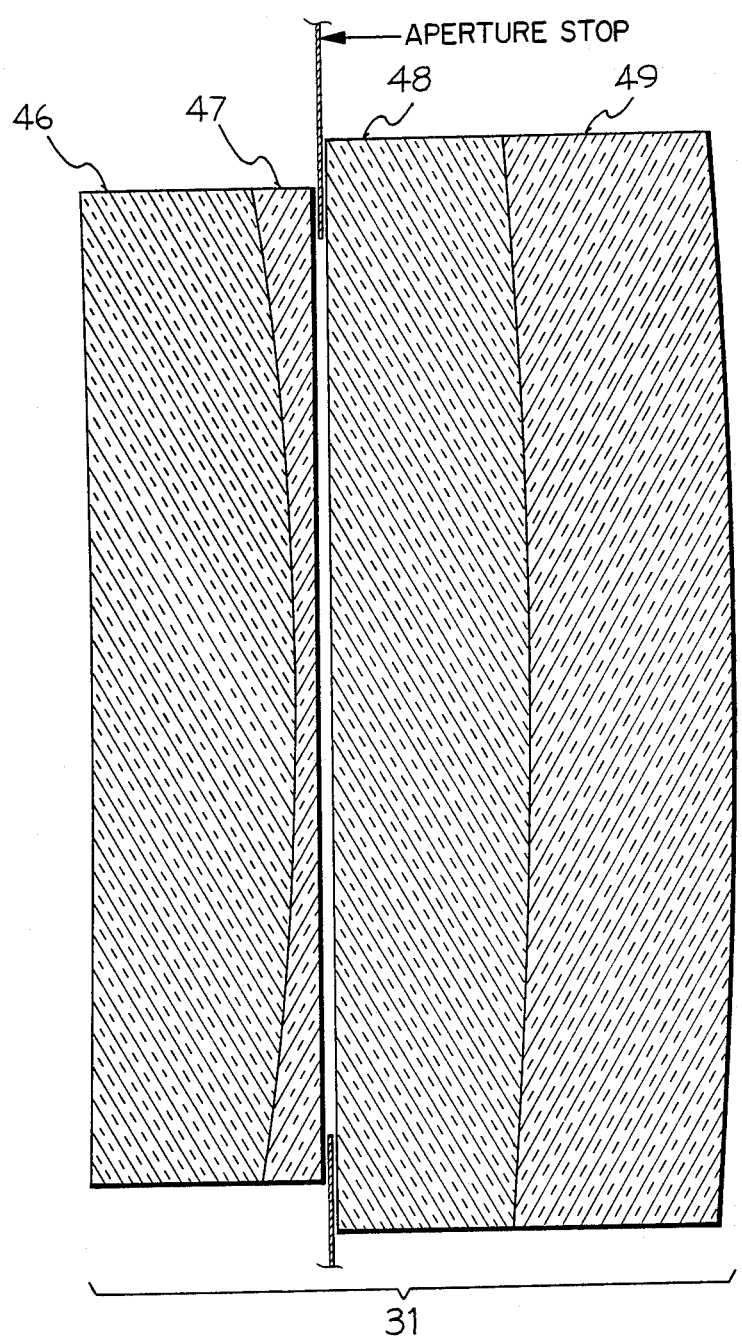

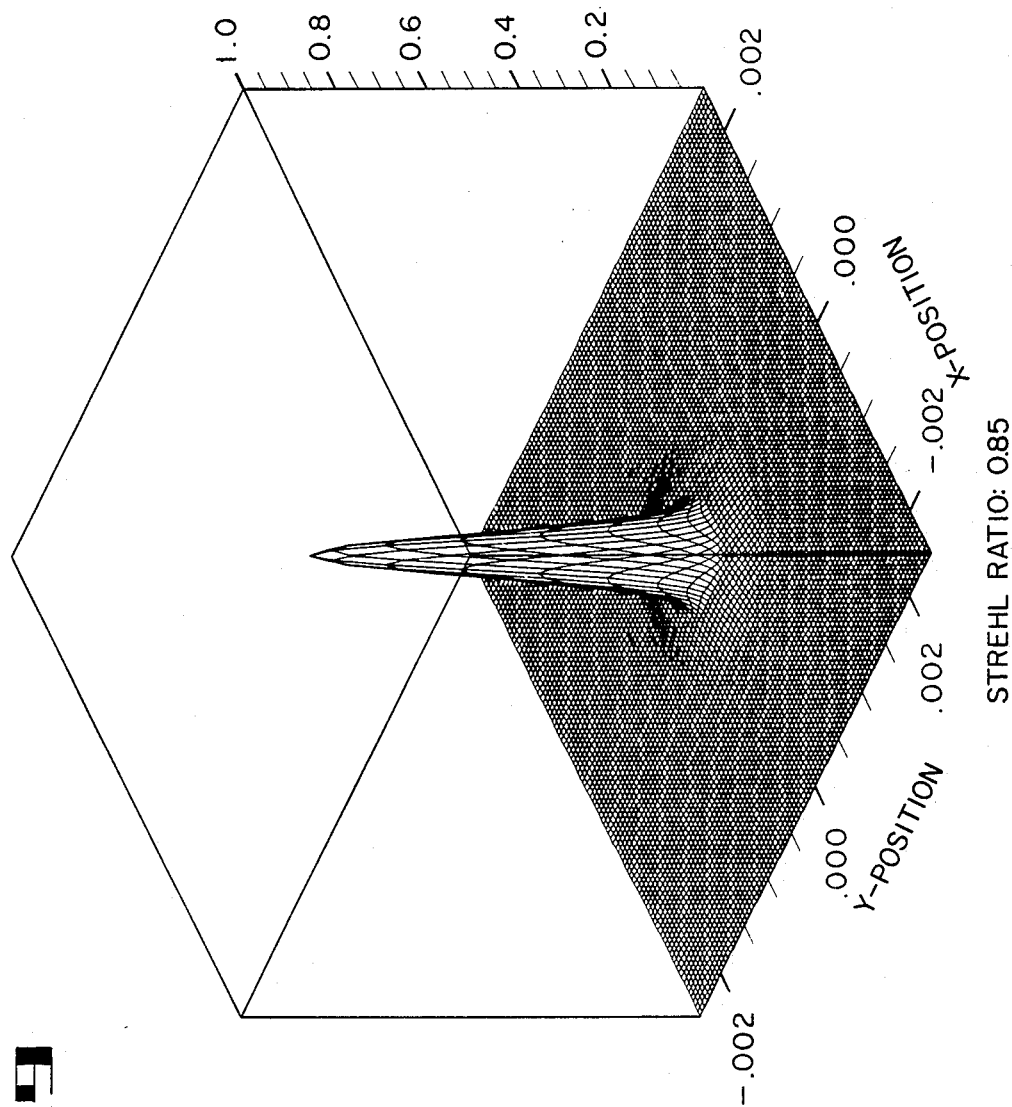
FIG_9

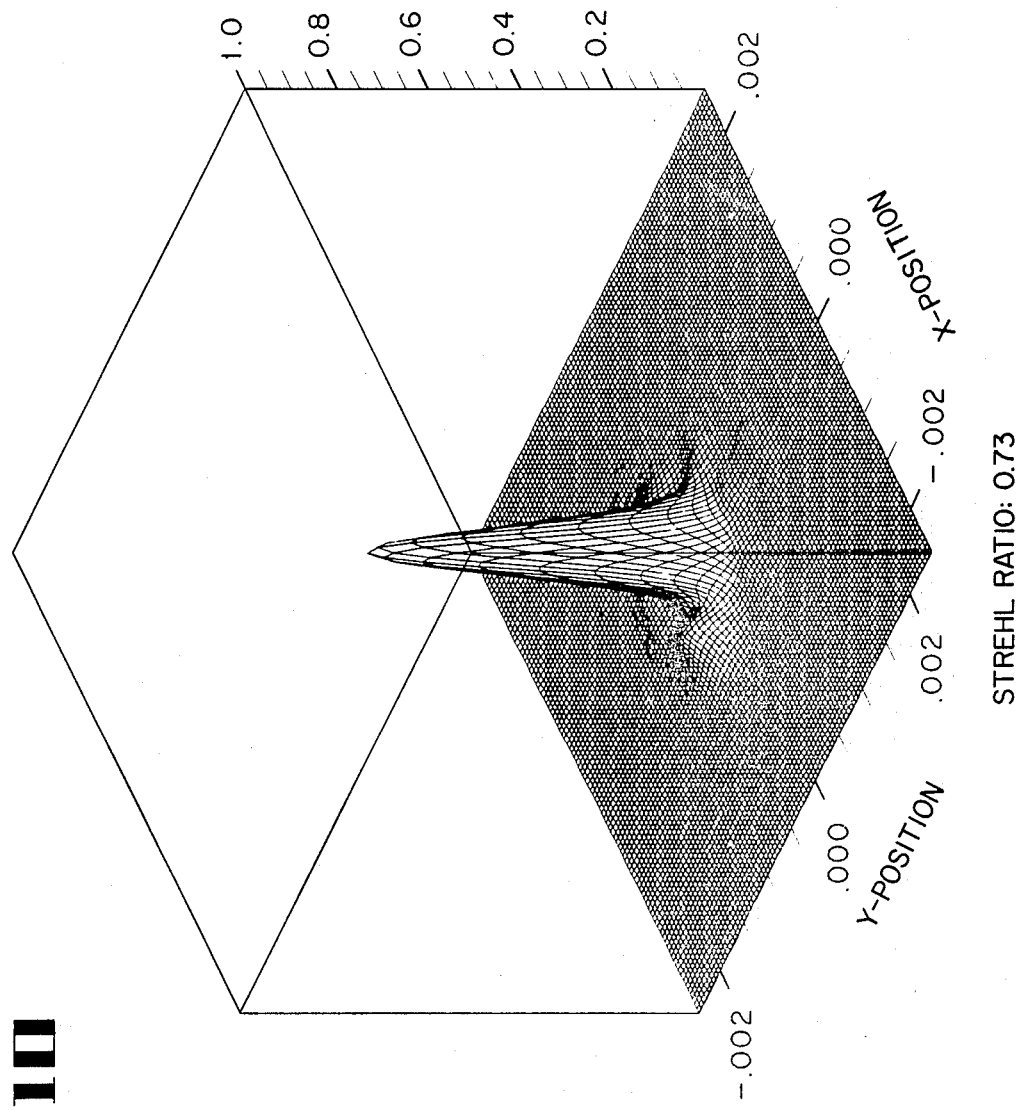
FIG_10

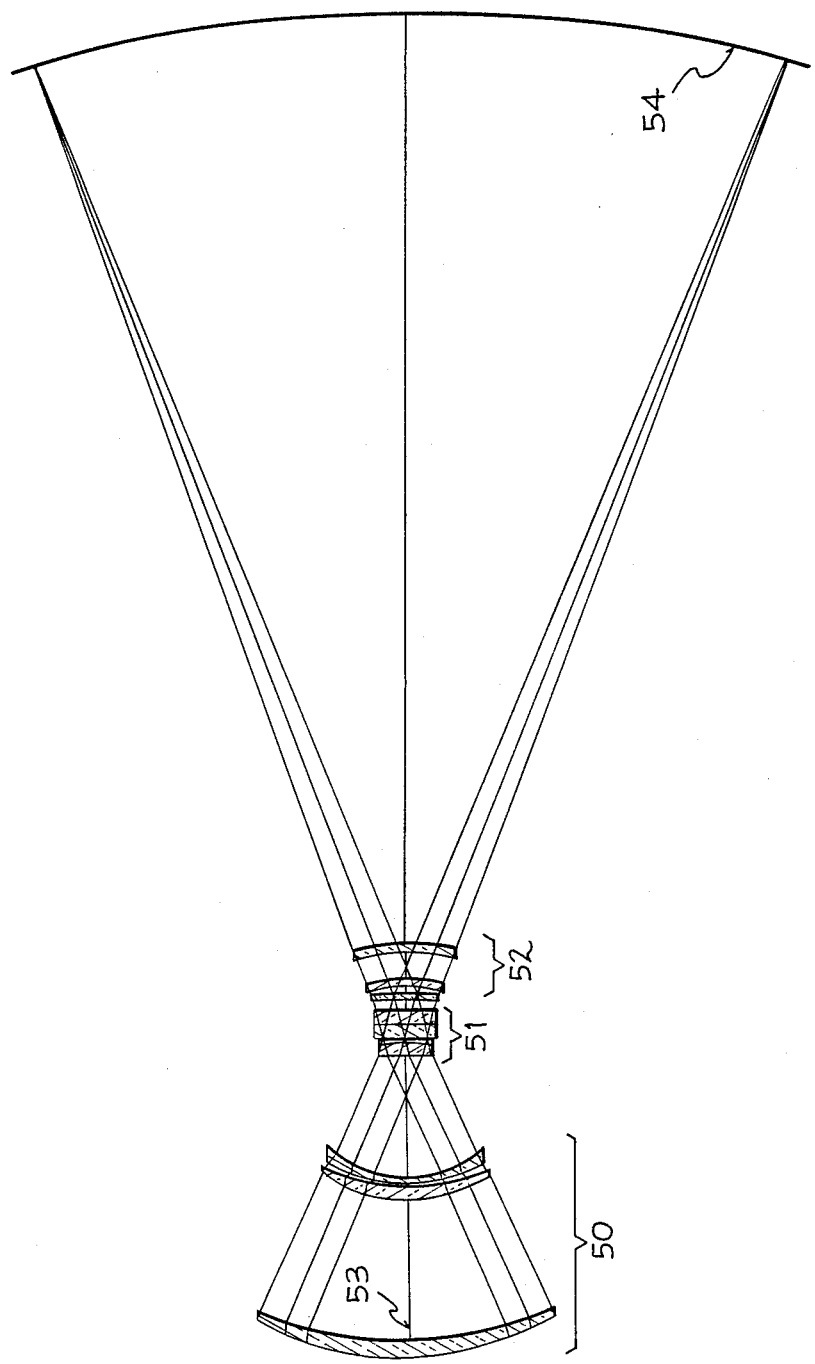
FIG_11

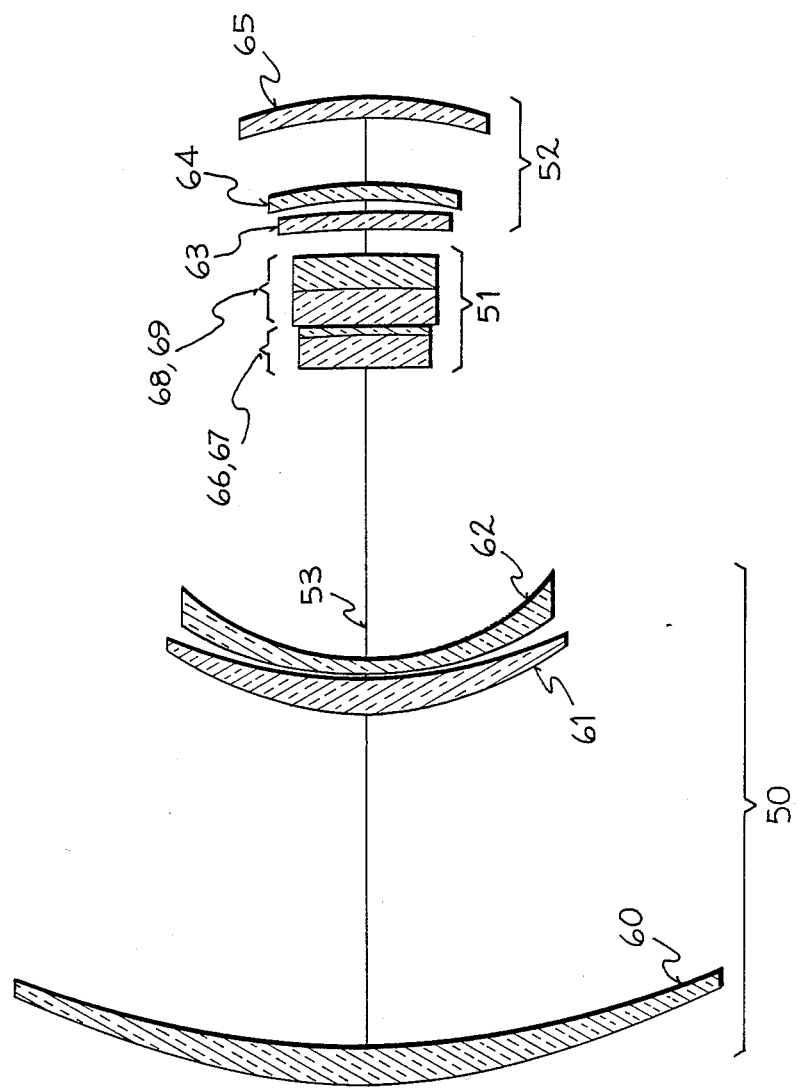

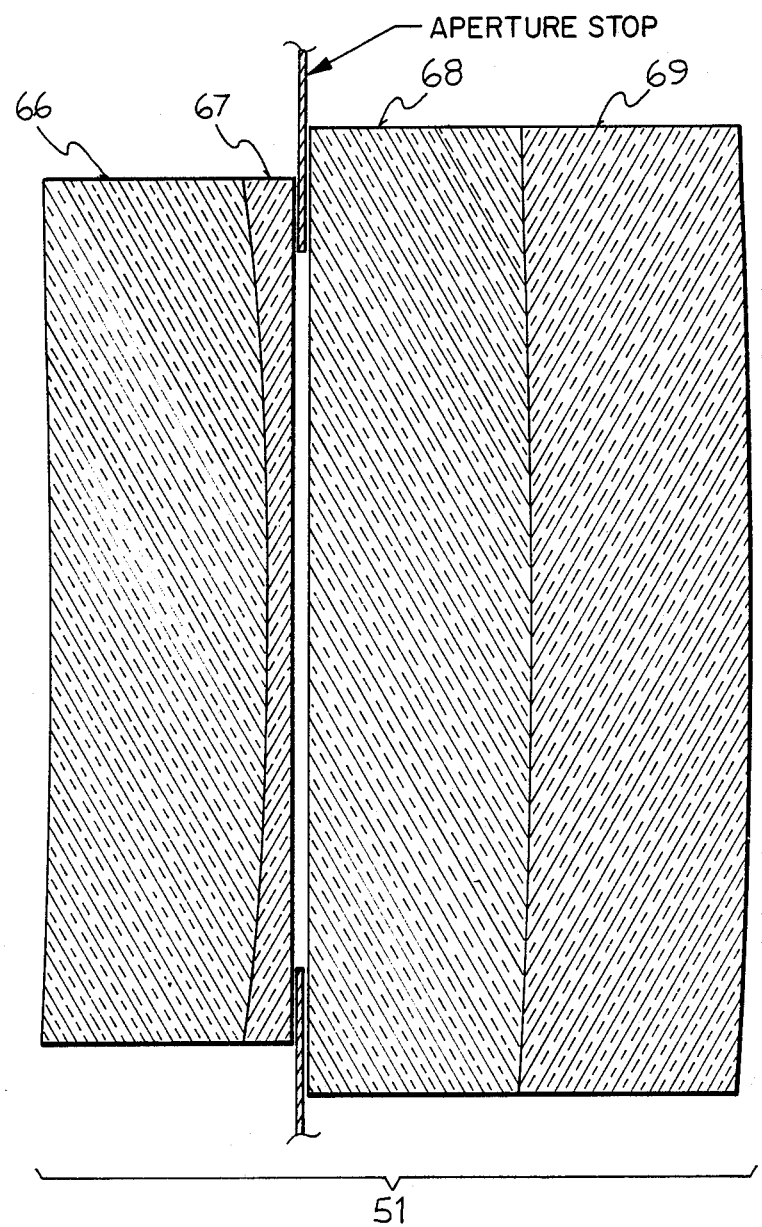
FIG_13

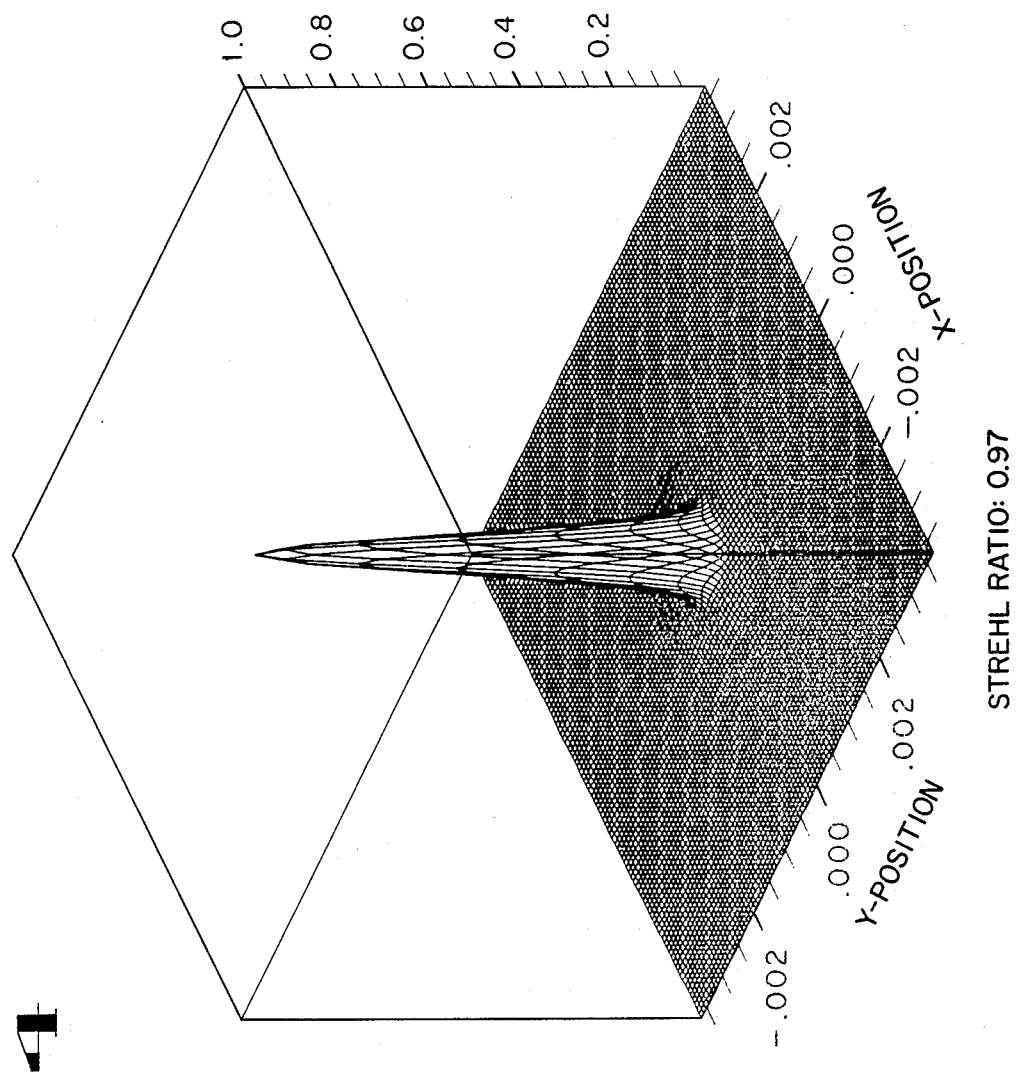
FIG_14

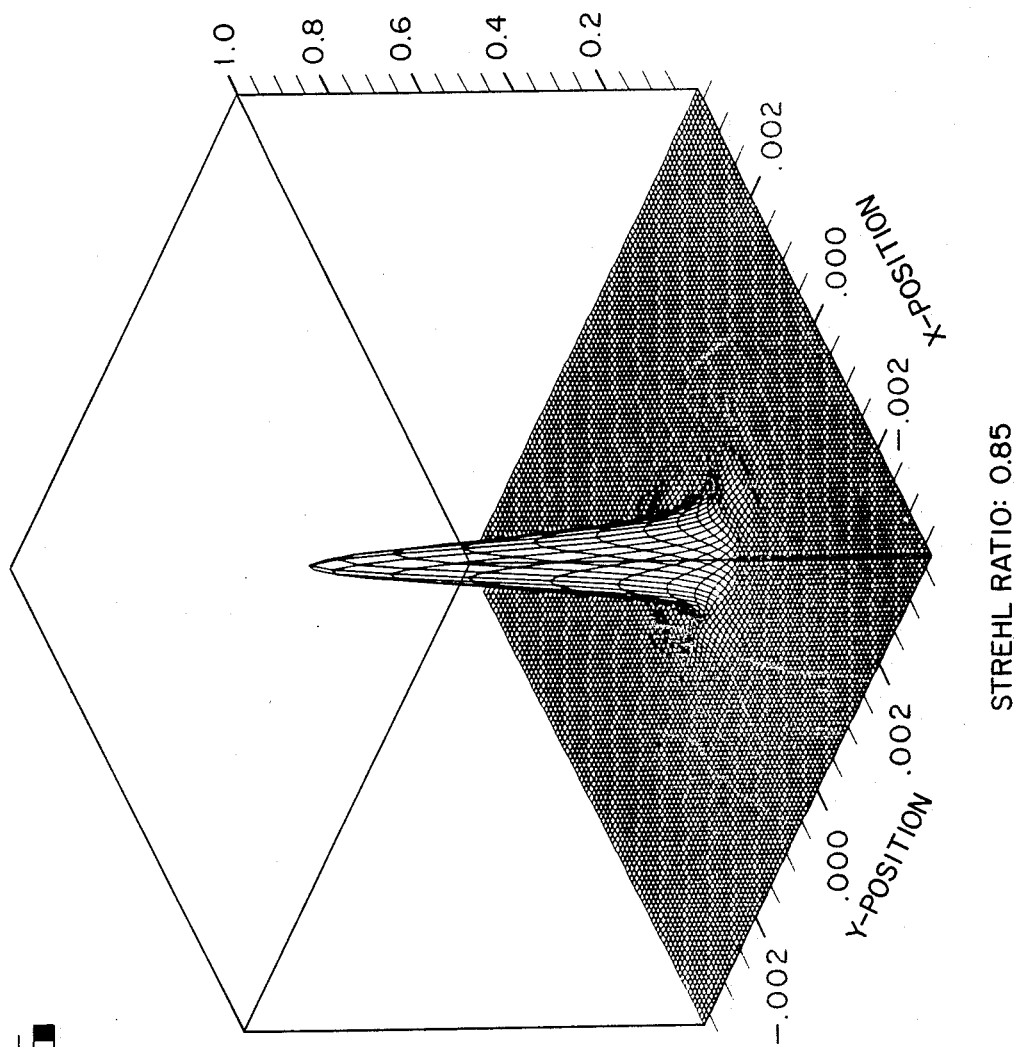
FIG_15

MAPPING LENS

TECHNICAL FIELD

The present invention pertains generally to refractive imaging systems, and more particularly to wide-field lenses for use in precision mapping cameras.

BACKGROUND ART

The resolving power of a lens is limited primarily by diffraction, and by monochromatic and chromatic aberrations. The basic design form of a lens is generally determined by the intended application. However, after the basic design form of a lens has been determined, the lens designer ordinarily tries to correct the basic design form to optimize performance by minimizing monochromatic and chromatic aberrations. If the basic design form of a lens were left uncorrected, the five so-called "Seidel aberrations" (viz., third-order monochromatic spherical aberration, coma, astigmatism, distortion, and field curvature) would dominate the performance.

The first task of the lens designer in correcting for monochromatic and chromatic aberrations is ordinarily to balance the third-order monochromatic aberrations against the fifth-order and higher-order monochromatic aberrations so that a monochromatic aberration balance is achieved, which optimizes performance for the particular design form. Correction of the basic design form of a lens to minimize monochromatic aberrations is accomplished primarily by controlling the geometry of the design.

In addition to the limitations on performance imposed by monochromatic aberrations, there are also performance limitations imposed by paraxial chromatic aberrations, which are the first-order and higher-order axial chromatic aberrations (also called primary axial color and secondary axial color), and the first-order and higher-order lateral chromatic aberrations (also called primary lateral color and secondary lateral color). A lens can be designed so that axial color and lateral color are eliminated (i.e., so that "color correction" is achieved) at a desired number of wavelengths, provided that compatible optical materials for obtaining the desired color correction are used for the refractive elements of the lens, and provided also that appropriate geometrical parameters for the design form of the lens are found. Elimination of axial and lateral color cannot be achieved, unless compatible optical materials are used for the refractive elements of the lens. Unless compatible optical materials are used, no amount of adjustment of the geometrical parameters of the design form of the lens can result in elimination axial and lateral color.

A technique for selecting compatible optical materials for the refractive elements of a lens so as to make possible the elimination of first-order axial chromatic aberration at a specified number of wavelengths for paraxial rays passing through the lens was disclosed in co-pending U.S. patent application Ser. No. 419,705. A lens designed so that first-order axial chromatic aberration has been eliminated for paraxial rays at particular wavelengths is said to be "color-corrected" at those wavelengths. The elimination of first-order axial chromatic aberration for paraxial rays passing through a lens concomitantly reduces higher-order axial chromatic aberrations for paraxial rays, and also reduces first-order and higher-order lateral chromatic aberrations as well.

Unless compatible optical materials are used for the refractive elements of an optical system, no amount of effort by the optical designer in adjusting the geometrical parameters of the system can result in elimination of paraxial chromatic aberrations. However, if compatible optical materials are used, the optical designer, by creatively practicing his skill, may then be able to develop a design form in which first-order chromatic aberrations (axial and lateral) are substantially eliminated at a desired number of wavelengths, and in which higher-order chromatic aberrations are concomitantly minimized at wavelengths between the wavelengths at which the first-order paraxial chromatic aberrations are eliminated. It is noted, however, that even when compatible optical materials are used, the development of a design form for an optical system that is to be color-corrected at a desired number of wavelengths is generally not a matter of mere routine. In order to design a lens with zero first-order paraxial chromatic aberration at a specified number of wavelengths, it is generally necessary for the lens designer to invent a novel design form, even when compatible optical materials for the refractive elements of the lens are known a priori.

After the design form of a lens that is to be used for a particular application has been developed and corrected with respect to monochromatic aberrations and paraxial chromatic aberrations, a further limitation on performance (to wit, a limitation on resolving power) might still remain due to chromatic variations of the monochromatic aberrations. The seriousness of the effect of the chromatic variation of any particular monochromatic aberration upon the resolving power of a lens ordinarily depends upon the application for which the lens is intended. For lenses used in wide-field applications, the chromatic variation of coma ordinarily imposes the most significant limitation on resolving power.

Until the present invention, there was no general approach known to optical designers for minimizing chromatic variations of the monochromatic aberrations (and particularly the chromatic variation of coma) in a lens.

SUMMARY OF THE INVENTION

It is an object of the present invention to provide a wide-field lens for a large-format mapping camera, wherein the limitations on resolving power attributable to monochromatic aberrations have been minimized, wherein color-correction has been achieved at three discrete wavelengths, and wherein chromatic variations of the monochromatic aberrations (particularly the chromatic variation of coma) have been substantially eliminated.

A wide-field lens according to the present invention has a curved focal surface, which can be populated with photosensitive detectors (e.g., photodiodes or charge coupled devices) arranged either in a curvilinear array, or in a group of parallel curvilinear arrays, or in a full-surface matrix. The lens of the present invention is designed to have a substantially uniform resolving power from the center to the edge of the focal surface thereof. The curvature of the focal surface produces an image having an illumination fall-off from the center to the edge, which varies by a factor of only $\cos^{1.5} \theta$, where $\theta$ is the half-field angle of the lens. By way of comparison, the illumination fall-off for a conventional mapping lens having a flat focal surface typically varies by a factor of $\cos^3 \theta$ or $\cos^4 \theta$.

A wide-field lens according to certain preferred embodiments of the present invention can have an aperture diameter as large as 30 inches. By way of comparison, the lens aperture of a large-format precision mapping camera of the prior art was typically on the order of only one inch. The large-format camera (LFC) that flew on the space shuttle had a lens aperture of only 2.0 inches.

DESCRIPTION OF THE DRAWING

FIG. 1 is a profile drawing of a mapping lens according to the present invention with an effective focal length of 200 inches, a focal ratio of f/20, and a full field of view of 60° (i.e., ±30°), where off-axis marginal rays are shown focused on a curved focal surface.

FIG. 2 is an enlarged profile drawing of the refractive elements of the mapping lens shown in FIG. 1.

FIG. 3 is an enlarged profile drawing of the refractive elements in the region of the aperture stop of the mapping lens shown in FIG. 1.

FIG. 4 is a plot of the polychromatic diffraction point-spread function for on-axis rays incident upon the curved focal surface of the mapping lens shown in FIG. 1.

FIG. 5 is a plot of the polychromatic diffraction point-spread function for rays originating 30° off-axis that are incident upon the curved focal surface of the mapping lens shown in FIG. 1.

FIG. 6 is a profile drawing of a mapping lens according to the present invention with an effective focal length of 200 inches, a focal ratio of f/15, and a full field of view of 40° (i.e., ±20°), where off-axis marginal rays are shown focussed on a curved focal surface.

FIG. 7 is an enlarged profile drawing of the refractive elements of the mapping lens shown in FIG. 6.

FIG. 8 is an enlarged profile drawing of the refractive elements in the region of the aperture stop of the mapping lens shown in FIG. 6.

FIG. 9 is a plot of the polychromatic diffraction point-spread function for on-axis rays incident upon the curved focal surface of the mapping lens shown in FIG. 6.

FIG. 10 is a plot of the polychromatic diffraction point-spread function for rays originating 20° off-axis that are incident upon the curved focal surface of the mapping lens shown in FIG. 6.

FIG. 11 is a profile drawing of a mapping lens according to the present invention with an effective focal length of 300 inches, a focal ratio of f/20, and a full field of view of 40° (i.e., ±20°), where off-axis marginal rays are shown focussed on a curved focal surface.

FIG. 12 is an enlarged profile drawing of the refractive elements of the mapping lens shown in FIG. 11.

FIG. 13 is an enlarged profile drawing of the refractive elements in the region of the aperture stop of the mapping lens shown in FIG. 11.

FIG. 14 is a plot of the polychromatic diffraction point-spread function for on-axis rays incident upon the curved focal surface of the mapping lens shown in FIG. 11.

FIG. 15 is a plot of the polychromatic diffraction point-spread function for rays originating 20° off-axis that are incident upon the curved focal surface of the mapping lens shown in FIG. 11.

BEST MODE OF CARRYING OUT THE INVENTION

A first embodiment of a wide-field lens according to the present invention, which is intended for use in a large-format precision mapping camera, is illustrated in FIG. 1. The lens of FIG. 1 has a focal length of 200 inches, a focal ratio of f/20, and a 60° circular field of view. The lens of FIG. 1 consists of three groups of refractive elements, viz., a front group 10 comprising three lens elements, a middle group 11 comprising two pairs of lens elements, and a rear group 12 comprising three lens elements. The net power of the middle group 11 is substantially zero, and the two pairs of lens elements comprising the middle group 11 are positioned with respect to each other on opposite sides of a circular aperture stop of the lens.

The refractive elements (i.e., all the lens elements of the groups 10, 11 and 12) illustrated in FIG. 1 are shown in enlarged detail in FIG. 2. However, because of the scale of the illustrations, it is not possible to see the aperture stop of the lens in FIG. 1 or even in FIG. 2. Therefore, a further enlargement of the middle group 11 is shown in FIG. 3, wherein the aperture stop can be seen between the two pairs of lens elements comprising the middle group 11.

As shown in FIG. 1, the lens elements of the front group 10, the middle group 11 and the rear group 12 comprising the lens are symmetrically disposed coaxially with respect to each other on an optic axis 13. A first set of three marginal rays originating at a first peripheral region on the object surface of the lens is shown in FIG. 1 passing from left to right (in accordance with ray-tracing convention) through each of the lens elements of the lens. The three rays of this first set were chosen so that one ray passes through a first peripheral portion of the aperture stop, a second ray passes through the center of the aperture stop, and a third ray passes through a second peripheral portion of the aperture stop, where the first and second peripheral portions of the aperture stop are diametrically opposite each other. The three rays of this first set of marginal rays are seen in FIG. 1 to come to a common focus on a corresponding first peripheral portion of a curved focal surface 14.

A second set of three marginal rays originating at a second peripheral region on the object surface of the lens is also shown in FIG. 1, where the second peripheral region on the object surface is diametrically opposite the first peripheral region on the object surface at which the first set of marginal rays originates. The three rays of this second set pass from left to right through the lens elements comprising the lens so that one ray passes through the second peripheral portion of the aperture stop, a second ray passes through the center of the aperture stop, and a third ray passes through the first peripheral portion of the aperture stop. The three rays of this second set of marginal rays are seen in FIG. 1 to come to a common focus on a corresponding second peripheral portion of the curved focal surface 14.

In a typical wide-field mapping application for the lens shown in FIG. 1, a distant object (which as a practical matter can be considered as being planar) is mapped onto the curved focal surface 14. The curvature of the focal surface 14 is determined by the design form of the lens, which is dependent upon the choice of optical glasses used for the lens elements comprising the lens. In three dimensions, the focal surface 14 has a configuration that for practical purposes may be considered as substantially paraboloidal. A mosaic of photodetector elements such as photodiodes or CCD's (i.e., charge coupled devices) can be arranged in a full-surface matrix at the focal surface 14 to receive simultaneously all the rays focussed thereon per unit time interval as determined by electronic circuitry associated with the photodetector elements. Such a full-matrix array of photodetector elements provides a complete image of the distant object for each unit time interval. Alternatively, however, the photodetector elements could be arranged in a curvilinear strip on the focal surface 14, whereby the distant object that is to be mapped can be scanned in a manner that is conventionally practiced using a strip-camera technique. for stereoscopic imaging, the photodetector elements could be arranged in two parallel curvilinear strips on the focal surface 14, where the two strips are symmetrically disposed on opposite sides of the optic axis 13 at an angular separation that is determined by the required stereoscopic convergence angle.

For a conventional wide-field lens in which the focal surface is substantially planar, the relative illumination of the image formed at the focal surface falls off from the center to the edge of the focal surface by a factor of $\cos^4 \theta$, where $\theta$ is the half-field angle of the lens. It was known in the prior art that pupil coma could be introduced in certain circumstances to reduce the illumination fall-off for wide-field lenses to a factor of about $\cos^3 \theta$. However, for a wide-field lens according to the present invention in which the focal surface 14 is curved, the illumination fall-off has been reduced to a factor of approximately $\cos^{1.5} \theta$. Reduction of the illumination fall-off on the focal surface 14 of the lens shown in FIG. 1 to a factor of only approximately $\cos^{1.5} \theta$ is attributed to the fact that:

(1) The off-axis rays impinge at nearly normal incidence upon the curved focal surface 14; and
(2) The curved focal surface 14 is closer to the lens for off-axis rays than a planar focal surface would be.

The lens elements comprising the front group 10 and the rear group 12 are positioned with respect to each other in a so-called "Double Gauss" arrangement, which is a well-known design form used in designing lenses requiring wide fields of view (i.e., fields of view with half-angles in the range from 15° to 30°, depending upon particular application and performance requirements). The "Double Gauss" design form, however, generally has a large chromatic variation of coma, which dominates the performance of a lens for which monochromatic aberrations have been substantially eliminated. In accordance with the present invention, the two pairs of lens elements comprising the middle group 11 are positioned on opposite sides of the aperture stop of the lens to eliminate the chromatic variation of coma as a matter of any consequence in large-format mapping applications.

As shown in FIG. 2, the front group 10 comprises a first lens element 20, a second lens element 21 and a third lens element 22, and the rear group 12 comprises a first lens element 23, a second lens element 24 and a third lens element 25. The middle group 11 comprises a first pair of lens elements 26 and 27, which have contacting surfaces of the same curvature, and a second pair of lens elements 28 and 29, which also have contacting surfaces of the same curvature (but generally of different curvature from that of the contacting surfaces of the first pair of lens elements 26 and 27). The lens elements 26 and 27 comprising the first pair are positioned on one side of the aperture stop, and the lens elements 28 and 29 comprising the second pair are positioned on the opposite side of the aperture stop. The aperture stop is not visible in FIG. 2, but can be seen in the expanded scale of FIG. 3. The scale of FIG. 2 is 2.5 times larger than the scale of FIG. 1, and the scale of FIG. 3 is 6.7 times larger than the scale of FIG. 2.

In FIG. 3, the approximate position of the aperture stop of the lens is illustrated and labelled. According to the present invention, the function of the lens elements of the middle group 11 is to control the chromatic variation of coma in the lens system. The lens elements 26 and 27 comprising the first pair of lens elements of the middle group 11 are made of different optical materials, and the lens elements 28 and 29 comprising the second pair of lens elements of the middle group 11 are likewise made of different optical materials. However, the two optical materials from which the lens elements 26 and 27 are made are the same as the two optical materials from which the lens elements 28 and 29 are made. In fact, all of the lens elements 20 to 29 are made from only two different optical materials.

In the preferred embodiment illustrated in FIG. 1, each of the lens elements 20 to 29 is made from either Schott FK51 glass or Schott LAKN14 glass, which are used so that color-correction of the lens at three discrete wavelengths can be achieved. The design form for the lens illustrated in FIG. 1, which achieves color correction at three wavelengths, is specified in tabular format as follows:

TABLE I

| Surface No. | Radius (inches) | Thickness (inches) | Material |
|---|---|---|---|
| 1 | 48.782437 | 4.000000 | FK51 |
| 2 | 64.197305 | 2.695008 | Air |
| 3 | 28.557795 | 7.779186 | FK51 |
| 4 | 41.585376 | .167281 | Air |
| 5 | 29.993771 | 1.222199 | LAKN14 |
| 6 | 21.061858 | 27.706689 | Air |
| 7 | −158.247288 | 1.193884 | FK51 |
| 8 | −30.948006 | .333333 | LAKN14 |
| 9 | −418.675139 | .050396 | Air |
| 10 | .000000 | .067475 | Air |
| 11 | −556.507121 | 2.911325 | LAKN14 |
| 12 | −64.041351 | 3.084923 | FK51 |
| 13 | −84.365588 | .099465 | Air |
| 14 | −90.434474 | 1.236759 | LAKN14 |
| 15 | −71.701205 | .400000 | Air |
| 16 | −37.273531 | 1.187736 | FK51 |
| 17 | −34.647060 | 5.690091 | Air |
| 18 | −28.767241 | 1.607142 | FK51 |
| 19 | −26.464032 | 167.271800 | Air |
| 20 | −338.087463 | .000000 | Air | where the surfaces of the refractive elements of the lens are enumerated (in accordance with conventional optical design practice) from left to right along the optic axis 13. The "radius" listed for each surface is the radius of curvature of the surface measured in inches. The radius of curvature is positive if the center of curvature of the surface lies to the right of the surface, and negative if the center of curvature of the surface lies to the left of the surface. The "thickness" listed for each surface is the thickness of the refractive element bounded on the left by the indicated surface. Thickness is measured along the optic axis 13 in inches.

The "material" listed in TABLE I for each surface refers to the type of optical glass from which the refractive element lying to the right of the surface is made.

The optical materials from which the refractive elements of the lens shown in FIG. 1 are made are unambiguously identified in TABLE I by the manufacturer's catalog designation. Thus, the two different optical materials listed in TABLE I are Schott FK51 glass and Schott LAKN14 glass, which are marketed by Schott Optical Glass, Inc. of Duryea, Pa.

The optical glasses listed in TABLE I have indices of refraction $N_1$, $N_2$, $N_3$, $N_4$ and $N_5$ for the respective wavelengths 0.65, 0.53, 0.77, 0.50, and 0.80 micron.

TABLE II

| Surface No. | $N_1$ | $N_2$ | $N_3$ | $N_4$ | $N_5$ |
|---|---|---|---|---|---|
| 1 | 1.484939 | 1.488554 | 1.482751 | 1.489868 | 1.482326 |
| 3 | 1.484939 | 1.488554 | 1.483751 | 1.489868 | 1.482326 |
| 5 | 1.693272 | 1.701148 | 1.688509 | 1.704026 | 1.687579 |
| 7 | 1.484939 | 1.488554 | 1.482751 | 1.489868 | 1.482326 |
| 8 | 1.693272 | 1.701148 | 1.688509 | 1.704026 | 1.687579 |
| 11 | 1.693272 | 1.701148 | 1.688509 | 1.704026 | 1.687579 |
| 12 | 1.484939 | 1.488554 | 1.482751 | 1.489868 | 1.482326 |
| 14 | 1.693272 | 1.701148 | 1.688509 | 1.704026 | 1.687579 |
| 16 | 1.484939 | 1.488554 | 1.482751 | 1.489868 | 1.482326 |
| 18 | 1.484939 | 1.488554 | 1.482751 | 1.489868 | 1.482326 |

To provide a quantitative measure of the performance of the lens illustrated in FIG. 1, the polychromatic diffraction point-spread function for on-axis rays passing through the lens and impinging upon the curved focal surface 14 is plotted in FIG. 4. The polychromatic diffraction point-spread function is the weighted sum of the monochromatic point spread functions computed as Fourier transforms of the pupil functions at five wavelengths over a spectral range from 0.50 micron to 0.80 micron with a central wavelength of 0.65 micron. The spectral weighting used for the plot in FIG. 4 is the spectral weighting commonly used for silicon-based charge coupled devices.

A well-known measure of the quality of a particular optical design is the ratio of the peak intensity of the polychromatic diffraction point-spread function for the particular design to the peak intensity of the polychromatic diffraction point-spread function for a hypothetical aberration-free optical design over the same spectral wavelength band. This ratio, which is called the Strehl ratio, can be calculated for any given field angle. The polychromatic diffraction point-spread function for the optical design of the lens illustrated in FIG. 1 is plotted in FIG. 4 for on-axis rays. The Strehl ratio for the optical design of the lens illustrated in FIG. 1 for on-axis rays is 0.88.

For a field angle of 60° (i.e., for off-axis rays entering the first lens element 20 of the lens shown in FIG. 1 at a half-field angle of 30° with respect to the optic axis 13), the polychromatic diffraction point-spread function is plotted in FIG. 5. The Strehl ratio for the optical design of the lens illustrated in FIG. 1 for marginal rays in a 60° field of view is 0.68. The change in the Strehl ratio for the lens design illustrated in FIG. 1 from 0.88 for on-axis rays to 0.68 for marginal rays in a 60° field of view is so small as to be imperceptible to the human eye, which indicates that the performance of this lens design is limited only by diffraction.

A second embodiment of a wide-field lens according to the present invention, which is also intended for use in a large-format precision mapping camera, is illustrated in FIG. 6. The lens of FIG. 6 has a focal length of 200 inches, a focal ratio of f/15, and a 40° circular field of view. The lens of FIG. 6 consists of three groups of refractive elements, viz., a front group 30 comprising three lens elements, a middle group 31 comprising two pairs of lens elements, and a rear group 32 comprising three lens elements. The net power of the middle group 31 is substantially zero, and the two pairs of lens elements comprising the middle group 31 are positioned with respect to each other on opposite sides of a circular aperture stop of the lens.

The lens elements of the groups 30, 31 and 32 illustrated in FIG. 6 are shown in enlarged detail in FIG. 7. Because of the scale of the illustrations, the aperture stop of the lens is not visible in FIG. 6 or FIG. 7. A further enlargement of the middle group 31 is shown in FIG. 8, wherein the aperture stop can be seen between the two pairs of lens elements comprising the middle group 31.

As shown in FIG. 6, the lens elements of the front group 30, the middle group 31 and the rear group 32 are symmetrically disposed coaxially with respect to each other on an optic axis 33. A first set of three marginal rays originating at a first peripheral region on the object surface of the lens is shown in FIG. 6 passing from left to right (in accordance with ray-tracing convention) through the lens elements comprising the lens. The three rays of this first set were chosen so that one ray passes through a first peripheral portion of the aperture stop, a second ray passes through the center of the aperture stop, and a third ray passes through a second peripheral portion of the aperture stop, where the first and second peripheral portions of the aperture stop are diametrically opposite each other. The three rays of this first set of marginal rays are seen in FIG. 6 to come to a common focus on a corresponding first peripheral portion of a curved focal surface 34.

A second set of three marginal rays originating at a second peripheral region on the object surface of the lens is also shown in FIG. 6, where the second peripheral region on the object surface is diametrically opposite the first peripheral region on the object surface at which the first set of marginal rays originates. The three rays of this second set pass from left to right through the lens elements comprising the lens so that one ray passes through the second peripheral portion of the aperture stop, a second ray passes through the center of the aperture stop, and a third ray passes through the first peripheral portion of the aperture stop. The three rays of this second set of marginal rays are seen in FIG. 6 to come to a common focus on a corresponding second peripheral portion of the curved focal surface 34.

As shown in FIG. 7, the front group 30 comprises a first lens element 40, a second lens element 41 and a third lens element 42, and the rear group 32 comprises a first lens element 43, a second lens element 44 and a third lens element 45. The middle group 31 comprises a first pair of lens elements 46 and 47, which have contacting surfaces of the same curvature, and a second pair of lens elements 48 and 49, which also have contacting surfaces of the same curvature (but of different curvature from that of the contacting surfaces of the first pair of lens elements 46 and 47). The lens elements 46 and 47 comprising the first pair are positioned on one side of the aperture stop, and the lens elements 48 and 49 comprising the second pair are positioned on the opposite side of the aperture stop. The approximate position of the aperture stop is illustrated and labelled in FIG. 7.

The lens elements 46 and 47 comprising the first pair of lens elements of the middle group 31 are made of different optical materials, and the lens elements 48 and 49 comprising the second pair of lens elements of the middle group 31 are likewise made of different optical materials. However, the two optical materials from which the lens elements 46 and 47 are made are the same as the two optical materials from which the lens elements 48 and 49 are made. The entire lens illustrated in FIG. 6 is made from only two different optical materials (viz., Schott FK51 glass and Schott LAKN14 glass), which are selected so that color-correction of the lens at three discrete wavelengths can be achieved. The design form for the lens illustrated in FIG. 6 achieves color correction at three wavelengths, and is specified in tabular format as follows:

TABLE III

| Surface No. | Radius (inches) | Thickness (inches) | Material |
| --- | --- | --- | --- |
| 1 | 54.988045 | 2.654317 | FK51 |
| 2 | 70.642123 | 26.235179 | Air |
| 3 | 26.322886 | 2.666667 | FK51 |
| 4 | 39.920346 | .167281 | Air |
| 5 | 28.709501 | 1.222199 | LAKN14 |
| 6 | 21.315867 | 22.760529 | Air |
| 7 | −313.641980 | 2.685032 | FK51 |
| 8 | −42.256068 | .333333 | LAKN14 |
| 9 | −542.805182 | .067450 | Air |
| 10 | .000000 | .067475 | Air |
| 11 | −434.340394 | 2.623059 | LAKN14 |
| 12 | −80.870196 | 2.655576 | FK51 |
| 13 | −88.620876 | 1.916938 | Air |
| 14 | −82.994012 | 1.236759 | LAKN14 |
| 15 | −73.707986 | 1.000000 | Air |
| 16 | −35.774768 | 1.187736 | FK51 |
| 17 | −38.279278 | 4.988101 | Air |
| 18 | −33.187875 | 1.607142 | FK51 |
| 19 | −28.670296 | 168.926530 | Air |
| 20 | −270.689766 | .000000 | Air | where the surfaces of the refractive elements are enumerated in TABLE III in accordance with the same convention as used for TABLE I.

The optical glasses listed in TABLE III are the same as the optical glasses listed in TABLE I, and consequently have the same indices of refraction for the same wavelengths.

To provide a quantitative measure of the performance of the lens illustrated in FIG. 6, the polychromatic diffraction point-spread function for on-axis rays passing through the lens and impinging upon the curved focal surface 34 is plotted in FIG. 9. The spectral weighting used for the plot in FIG. 9 is the same as the spectral weighting used for the plot in FIG. 4. The Strehl ratio for the lens design illustrated in FIG. 6 for on-axis rays is 0.85.

In FIG. 10, the polychromatic diffraction point-spread function for the lens design illustrated in FIG. 6 is plotted for a field angle of 40° (i.e., for off-axis rays entering the first lens element 40 at a half-field angle of 20° with respect to the optic axis 33). The Strehl ratio for the lens design illustrated in FIG. 6 for marginal rays in a 40° field of view is 0.73. The change in the Strehl ratio for the lens design of FIG. 6 from 0.85 for on-axis rays to 0.73 for marginal rays in a 40° field of view is so small as to be imperceptible to the human eye, which indicates that the performance of this lens design is limited only by diffraction.

A third embodiment of a wide-field lens according to the present invention, which likewise is intended for use in a large-format precision mapping camera, is illustrated in FIG. 11. The lens of FIG. 11 has a focal length of 300 inches, a focal ratio of f/20, and a 40° circular field of view. The lens of FIG. 11 consists of three groups of refractive elements, viz., a front group 50 comprising three lens elements, a middle group 51 comprising two pairs of lens elements, and a rear group 52 comprising three lens elements. The net power of the middle group 51 is substantially zero, and the two pairs of lens elements comprising the middle group 51 are positioned with respect to each other on opposite sides of a circular aperture stop of the lens. The lens elements of the groups 50, 51 and 52 illustrated in FIG. 11 are shown in enlarged detail in FIG. 12. Because of the scale of the illustrations, the aperture stop of the lens is not visible in FIG. 11 or even in FIG. 12. In a further enlargement of the middle group 51 as shown in FIG. 13, the aperture stop is seen between the two pairs of lens elements comprising the middle group 51.

As shown in FIG. 11, the lens elements of the front group 50, the middle group 51 and the rear group 52 are symmetrically disposed coaxially with respect to each other on an optic axis 53. A first set of three marginal rays originating at a first peripheral region on the object surface of the lens is shown in FIG. 11 passing from left to right (in accordance with ray-tracing convention) through the lens elements comprising the lens. The three rays of this first set were chosen so that one ray passes through a first peripheral portion of the aperture stop, a second ray passes through the center of the aperture stop, and a third ray passes through a second peripheral portion of the aperture stop, where the first and second peripheral portions of the aperture stop are diametrically opposite each other. The three rays of this first set of marginal rays are seen in FIG. 11 to come to a common focus on a corresponding first peripheral portion of a curved focal surface 54.

A second set of three marginal rays originating at a second peripheral region on the object surface of the lens is also shown in FIG. 11, where the second peripheral region on the object surface is diametrically opposite the first peripheral region on the object surface at which the first set of marginal rays originates. The three rays of this second set pass from left to right through the lens elements comprising the lens so that one ray passes through the second peripheral portion of the aperture stop, a second ray passes through the center of the aperture stop, and a third ray passes through the first peripheral portion of the aperture stop. The three rays of this second set of marginal rays are seen in FIG. 11 to come to a common focus on a corresponding second peripheral portion of the curved focal surface 54.

As shown in FIG. 12, the front group 50 comprises a first lens element 60, a second lens element 61 and a third lens element 62, and the rear group comprises a first lens element 63, a second lens element 64 and a third lens element 65. The middle group 51 comprises a first pair of lens elements 66 and 67, which have contacting surfaces of the same curvature, and a second pair of lens elements 68 and 69, which also have contacting surfaces of the same curvature (but of different curvature from that of the contacting surfaces of the first pair of lens elements 66 and 67). The lens elements 66 and 67 comprising the first pair are positioned on one side of the aperture stop, and the lens elements 68 and 69 comprising the second pair are positioned on the opposite side of the aperture stop. In FIG. 13, the aperture stop is shown between the two pairs of lens elements of the middle group 51.

In the enlarged view provided by FIG. 13, the approximate position of the aperture stop of the lens is illustrated and labelled. The lens elements 66 and 67 comprising the first pair of lens elements of the middle group 51 are made of different optical materials, and the lens elements 68 and 69 comprising the second pair of lens elements of the middle group 51 are likewise made of different optical materials. However, the two optical materials from which the lens elements 66 and 67 are made are the same as the two optical materials from which the lens elements 68 and 69 are made. The entire lens illustrated in FIG. 11 is made from only two different optical materials (viz., Schott FK51 glass and Schott LAKN14 glass), which are selected so that color-correction of the lens at three discrete wavelengths can be achieved. The design form for the lens illustrated in FIG. 11 achieves color correction at three wavelengths, and is specified in tabular format as follows:

TABLE IV

| Surface No. | Radius (inches) | Thickness (inches) | Material |
|---|---|---|---|
| 1 | 83.131697 | 4.000000 | FK51 |
| 2 | 105.822287 | 39.331744 | Air |
| 3 | 39.157947 | 4.000000 | FK51 |
| 4 | 60.133495 | .252027 | Air |
| 5 | 43.033908 | 1.833298 | LAKN14 |
| 6 | 31.918041 | 34.140793 | Air |
| 7 | −358.140611 | 4.000000 | FK51 |
| 8 | −69.149220 | .500000 | LAKN14 |
| 9 | −762.552801 | .100000 | Air |
| 10 | .000000 | .100000 | Air |
| 11 | −1041.419709 | 4.000000 | LAKN14 |
| 12 | −160.903715 | 4.000000 | FK51 |
| 13 | −134.460084 | 2.874566 | Air |
| 14 | −123.955981 | 1.855138 | LAKN14 |
| 15 | −108.740200 | 1.500000 | Air |
| 16 | −46.482147 | 1.781603 | FK51 |
| 17 | −49.553189 | 7.482152 | Air |
| 18 | −50.344282 | 2.410712 | FK51 |
| 19 | −43.609621 | 253.555880 | Air |
| 20 | −409.066718 | .000000 | Air | where the surfaces of the refractive elements are enumerated in TABLE IV in accordance with the same convention as used for TABLES I and III. The optical glasses listed in TABLE IV are the same as the optical glasses listed in TABLES I and III, and consequently have the same indices of refraction for the same wavelengths, and also the same Abbe numbers.

To provide a quantitative measure of the performance of the lens illustrated in FIG. 11, the polychromatic diffraction point-spread function for on-axis rays passing through the lens and impinging upon the curved focal surface 54 is plotted in FIG. 14. The spectral weighting used for the plot in FIG. 14 is the same as the spectral weighting used for the plots in FIGS. 4 and 9. The Strehl ratio for the lens design illustrated in FIG. 11 for on-axis rays is 0.97.

In FIG. 15, the polychromatic diffraction point-spread function for the lens design illustrated in FIG. 11 is plotted for a field angle of 40° (i.e., for off-axis rays entering the first lens element 60 at a half-field angle of 20° with respect to the optic axis 53). The Strehl ratio for the lens design illustrated in FIG. 11 for marginal rays in a 40° field of view is 0.85. The change in the Strehl ratio for the design of FIG. 11 from 0.97 for on-axis rays to 0.85 for marginal rays in a 40° field of view is so small as to be imperceptible to the human eye, which indicates that the performance of this lens design is limited only by diffraction.

This invention has been described above in terms of particular embodiments that are especially suitable for particular applications. However, other embodiments more suited to other applications would become apparent to practitioners skilled in the art of optical design upon perusing the foregoing specification and accompanying drawing. Therefore, the embodiments described herein are to be considered as illustrative of the invention, which is defined more generally by the following claims and their equivalents.

I claim:

1. A mapping lens for imaging an object lying within an extended field of view onto a focal surface, said lens comprising:
   (a) a front group of lens elements,
   (b) a middle group of lens elements, and
   (c) a rear group of lens elements,
   said middle group being disposed between said front and rear groups on an optic axis of said lens; said lens elements of said front, middle and rear groups being made from only two different optical materials; said front and rear groups of lens elements being disposed in a Double Gauss arrangement; said middle group of lens elements having substantially zero optical power; said lens elements of said front, middle and rear groups being configured and positioned with respect to each other on said optic axis so as to coact with each other to produce substantially zero first-order paraxial chromatic aberration at more than two discrete wavelengths and to produce substantially inconsequential chromatic variation of coma for said field of view.

2. The mapping lens of claim 1 wherein said focal surface is curved.

3. The mapping lens of claim 1 wherein said middle group of lens elements comprises a first pair of lens elements and a second pair of lens elements, said first and second pairs of lens elements being disposed on opposite sides of an aperture stop of said lens.

4. The mapping lens of claim 3 having a design form optimized for an effective focal length of 200 inches at a focal ratio of f/20 and a field of view of 60° substantially as follows:

| Surface No. | Radius (inches) | Thickness (inches) | Material |
|---|---|---|---|
| 1 | 48.782437 | 4.000000 | FK51 |
| 2 | 64.197305 | 2.695008 | Air |
| 3 | 28.557795 | 7.779186 | FK51 |
| 4 | 41.585376 | .167281 | Air |
| 5 | 29.993771 | 1.222199 | LAKN14 |
| 6 | 21.061858 | 27.706689 | Air |
| 7 | −158.247288 | 1.193884 | FK51 |
| 8 | −30.948006 | .333333 | LAKN14 |
| 9 | −418.675139 | .050396 | Air |
| 10 | .000000 | .067475 | Air |
| 11 | −556.507121 | 2.911325 | LAKN14 |
| 12 | −64.041351 | 3.084923 | FK51 |
| 13 | −84.365588 | .099465 | Air |
| 14 | −90.434474 | 1.236759 | LAKN14 |
| 15 | −71.701205 | .400000 | Air |
| 16 | −37.273531 | 1.187736 | FK51 |
| 17 | −34.647060 | 5.690091 | Air |
| 18 | −28.767241 | 1.607142 | FK51 |
| 19 | −26.464032 | 167.271800 | Air |
| 20 | −338.087463 | .000000 | Air |

5. The mapping lens of claim 3 having a design form optimized for an effective focal length of 200 inches at a focal ratio of f/15 and a field of view of 40° substantially as follows:

| Surface No. | Radius (inches) | Thickness (inches) | Materials |
| --- | --- | --- | --- |
| 1 | 54.988045 | 2.654317 | FK51 |
| 2 | 70.642123 | 26.235179 | Air |
| 3 | 26.322886 | 2.666667 | FK51 |
| 4 | 39.920346 | .167281 | Air |
| 5 | 28.709501 | 1.222199 | LAKN14 |
| 6 | 21.315867 | 22.760529 | Air |
| 7 | −313.641980 | 2.685032 | FK51 |
| 8 | −42.256068 | .333333 | LAKN14 |
| 9 | −542.805182 | .067450 | Air |
| 10 | .000000 | .067475 | Air |
| 11 | −434.340394 | 2.623059 | LAKN14 |
| 12 | −80.870196 | 2.655576 | FK51 |
| 13 | −88.620876 | 1.916938 | Air |
| 14 | −82.994012 | 1.236759 | LAKN14 |
| 15 | −73.707986 | 1.000000 | Air |
| 16 | −35.774768 | 1.187736 | FK51 |
| 17 | −38.279278 | 4.988101 | Air |
| 18 | −33.187875 | 1.607142 | FK51 |
| 19 | −28.670296 | 168.926530 | Air |
| 20 | −270.689766 | .000000 | Air |

6. The mapping lens of claim 3 having a design form optimized for an effective focal length of 300 inches at a focal ratio of f/20 and a field of view of 40° substantially as follows:

| Surface No. | Radius (inches) | Thickness (inches) | Material |
| --- | --- | --- | --- |
| 1 | 83.131697 | 4.000000 | FK51 |
| 2 | 105.822287 | 39.331744 | Air |
| 3 | 39.157947 | 4.000000 | FK51 |
| 4 | 60.133495 | .252027 | Air |
| 5 | 43.033908 | 1.833298 | LAKN14 |
| 6 | 31.918041 | 34.140793 | Air |
| 7 | −358.140611 | 4.000000 | FK51 |
| 8 | −69.149220 | .500000 | LAKN14 |
| 9 | −762.552801 | .100000 | Air |
| 10 | .000000 | .100000 | Air |
| 11 | −1041.419709 | 4.000000 | LAKN14 |
| 12 | −160.903715 | 4.000000 | FK51 |
| 13 | −134.460084 | 2.874566 | Air |
| 14 | −123.955981 | 1.855138 | LAKN14 |
| 15 | −108.740200 | 1.500000 | Air |
| 16 | −46.482147 | 1.781603 | FK51 |
| 17 | −49.553189 | 7.482152 | Air |
| 18 | −50.344282 | 2.410712 | FK51 |
| 19 | −43.609621 | 253.555880 | Air |
| 20 | −409.066718 | .000000 | Air |

* * * * *